Oct. 15, 1940.  W. H. SYMONS  2,217,822
WATER TREATING APPARATUS
Filed June 19, 1935   8 Sheets-Sheet 1
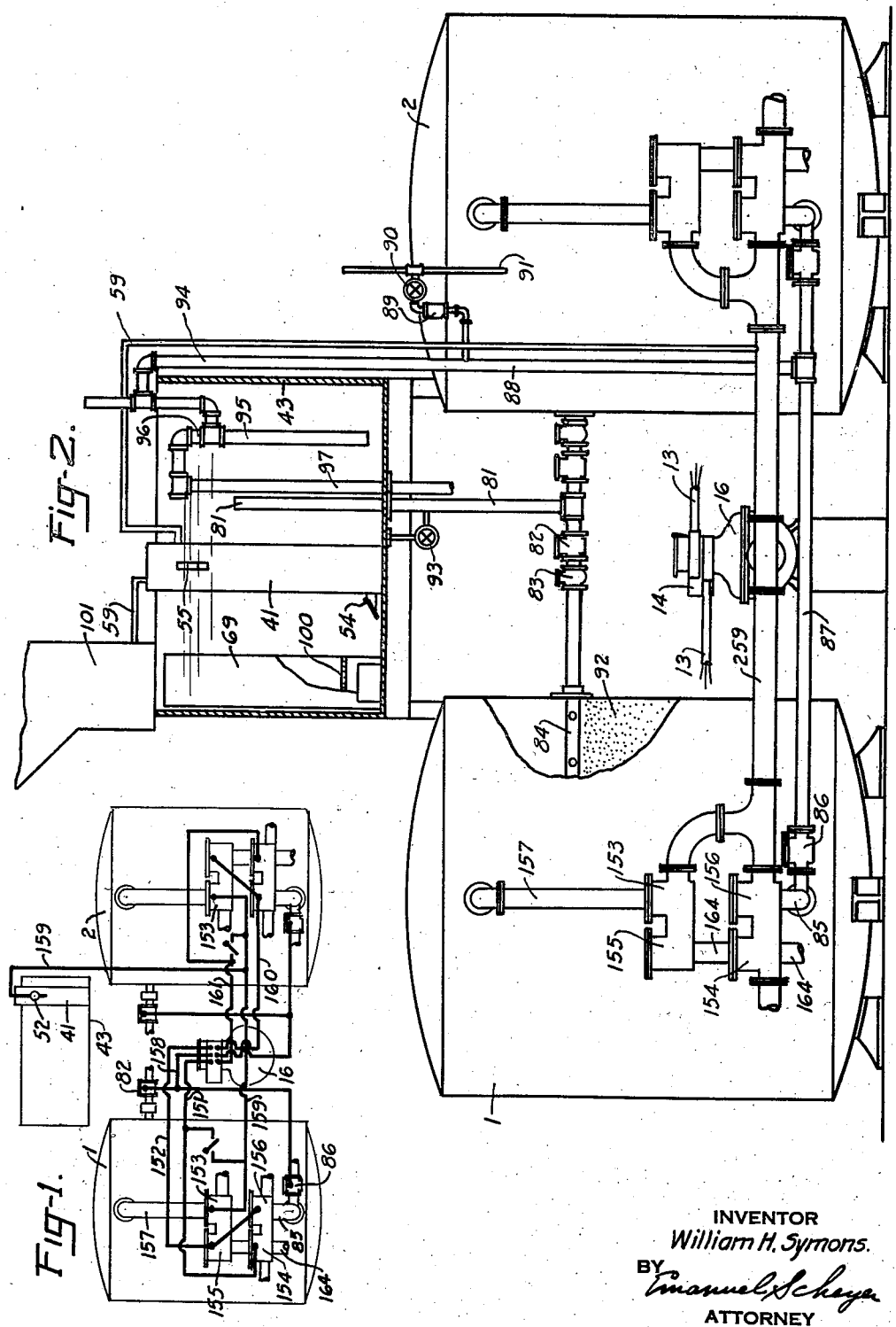
INVENTOR
William H. Symons.
BY
Emanuel Scheyer
ATTORNEY Oct. 15, 1940.  W. H. SYMONS  2,217,822
WATER TREATING APPARATUS
Filed June 19, 1935   8 Sheets-Sheet 2
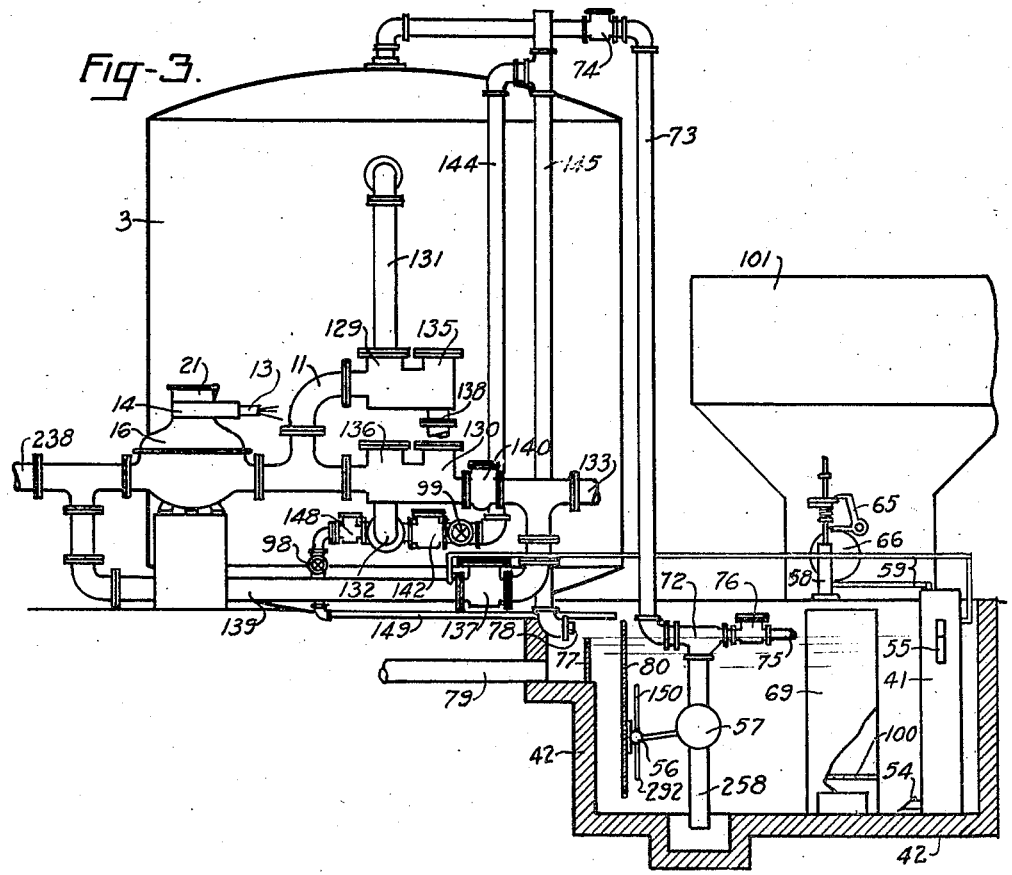
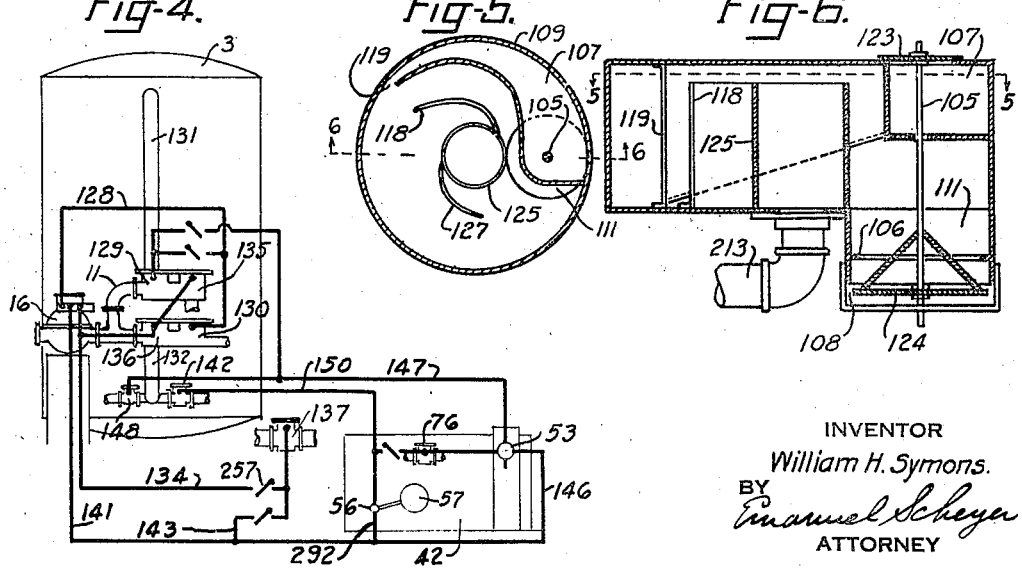
INVENTOR
William H. Symons.
BY
Emanuel Scheyer
ATTORNEY

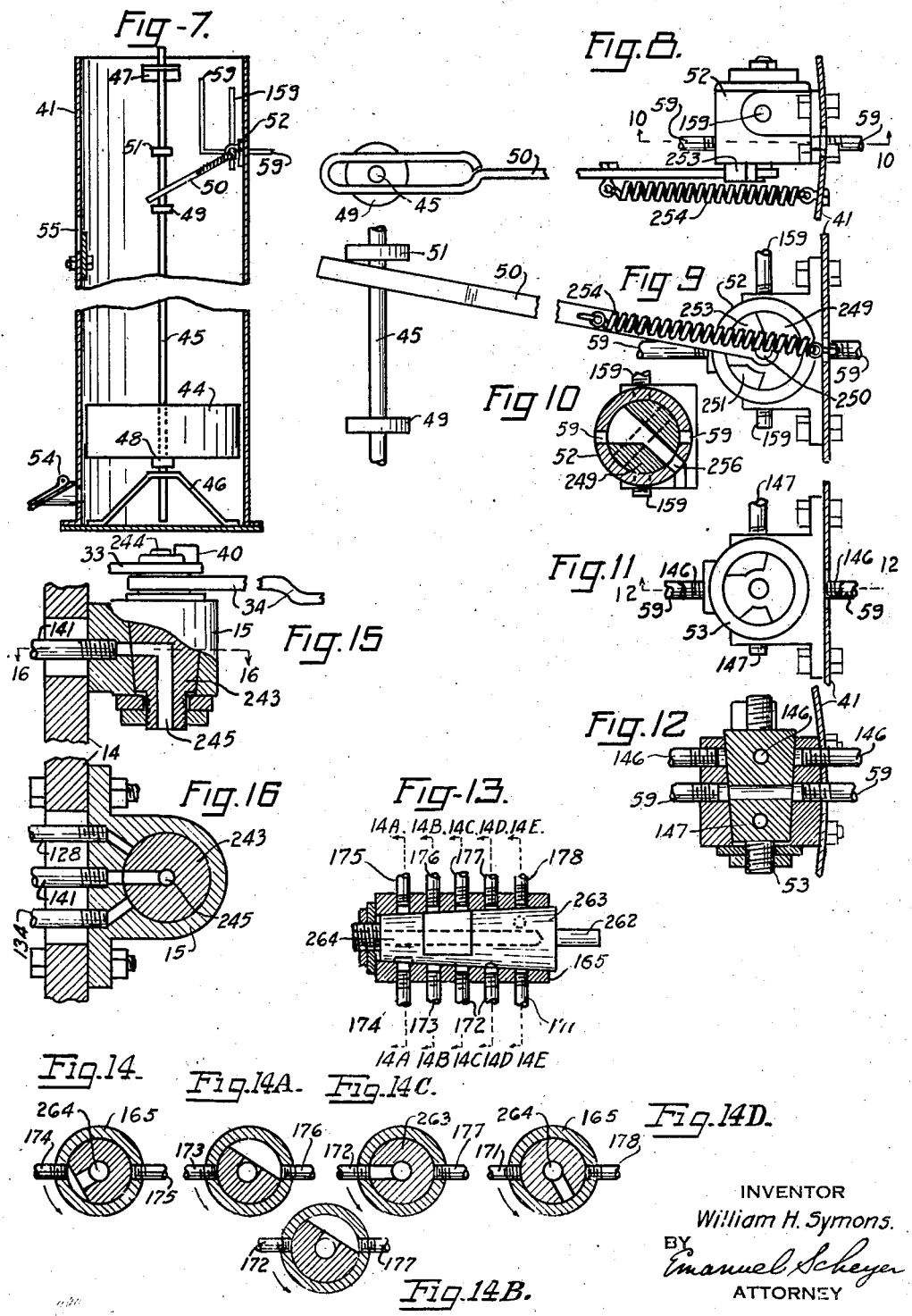

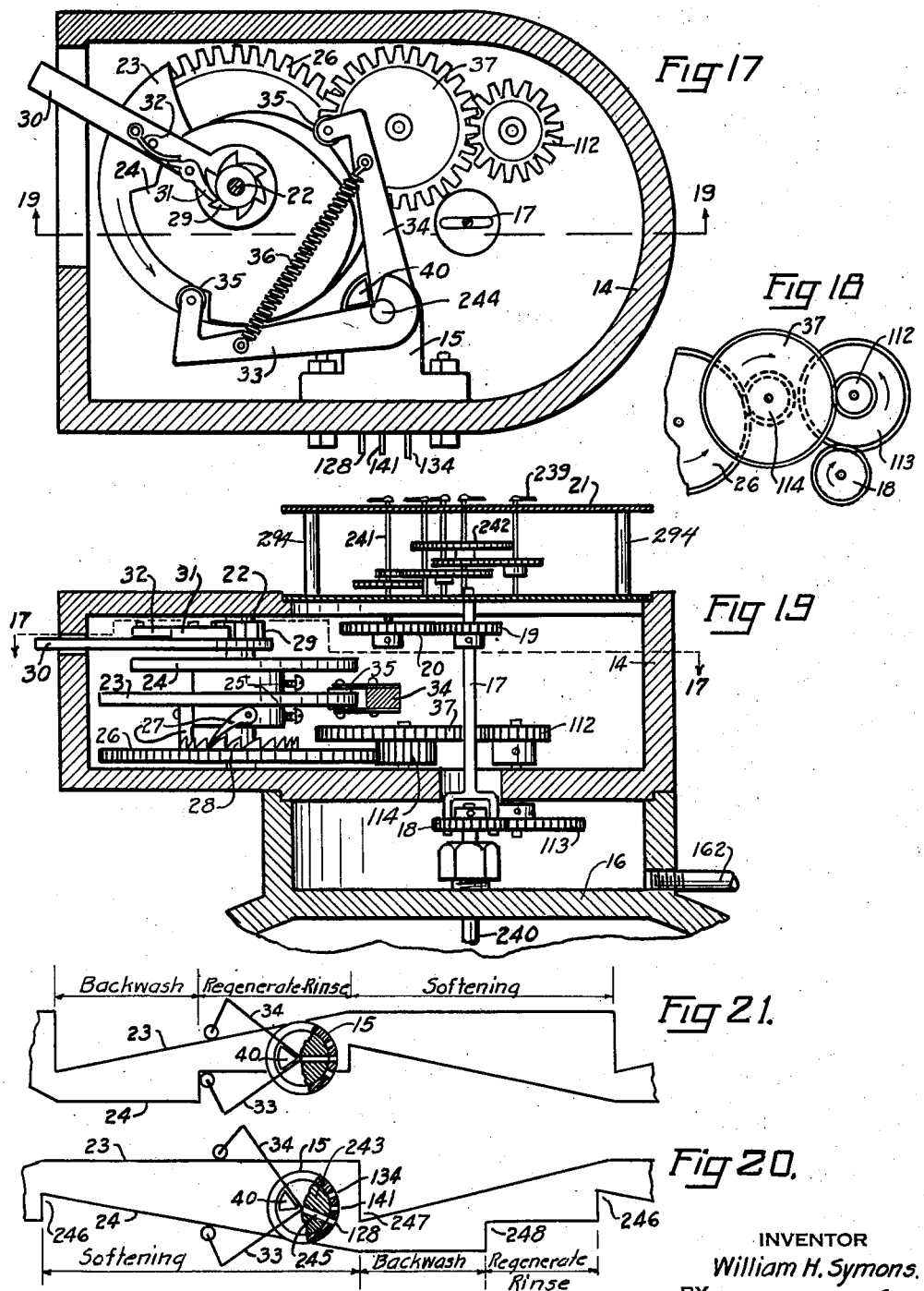

Oct. 15, 1940.  W. H. SYMONS  2,217,822
WATER TREATING APPARATUS
Filed June 19, 1935    8 Sheets-Sheet 5
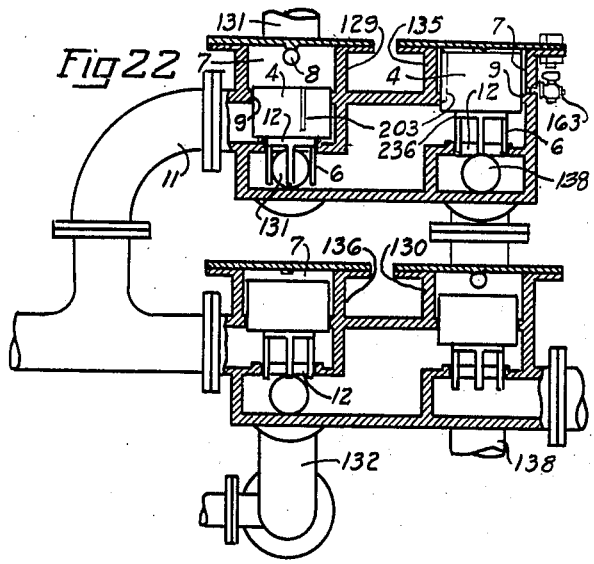
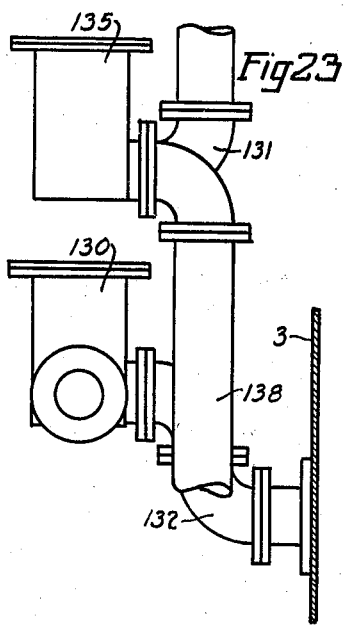
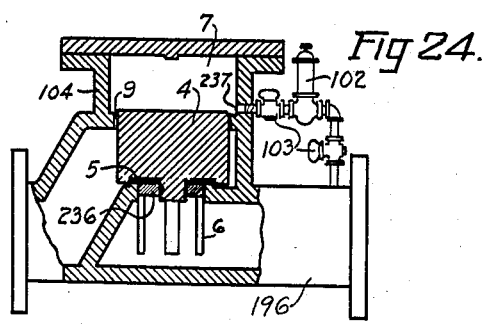
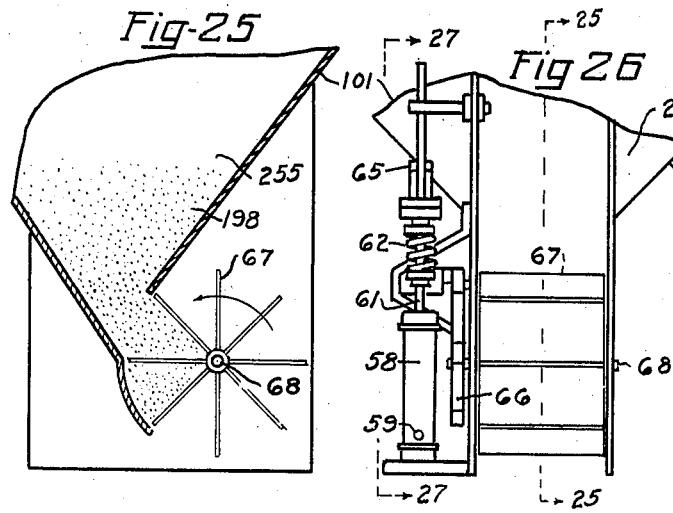
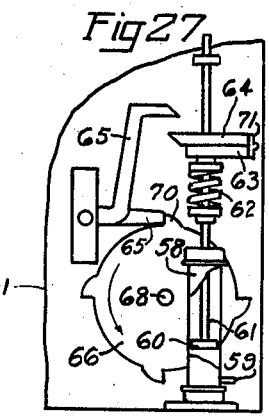
INVENTOR
William H. Symons.
BY Emanuel Scheyer
ATTORNEY Oct. 15, 1940.   W. H. SYMONS   2,217,822
WATER TREATING APPARATUS
Filed June 19, 1935   8 Sheets-Sheet 6
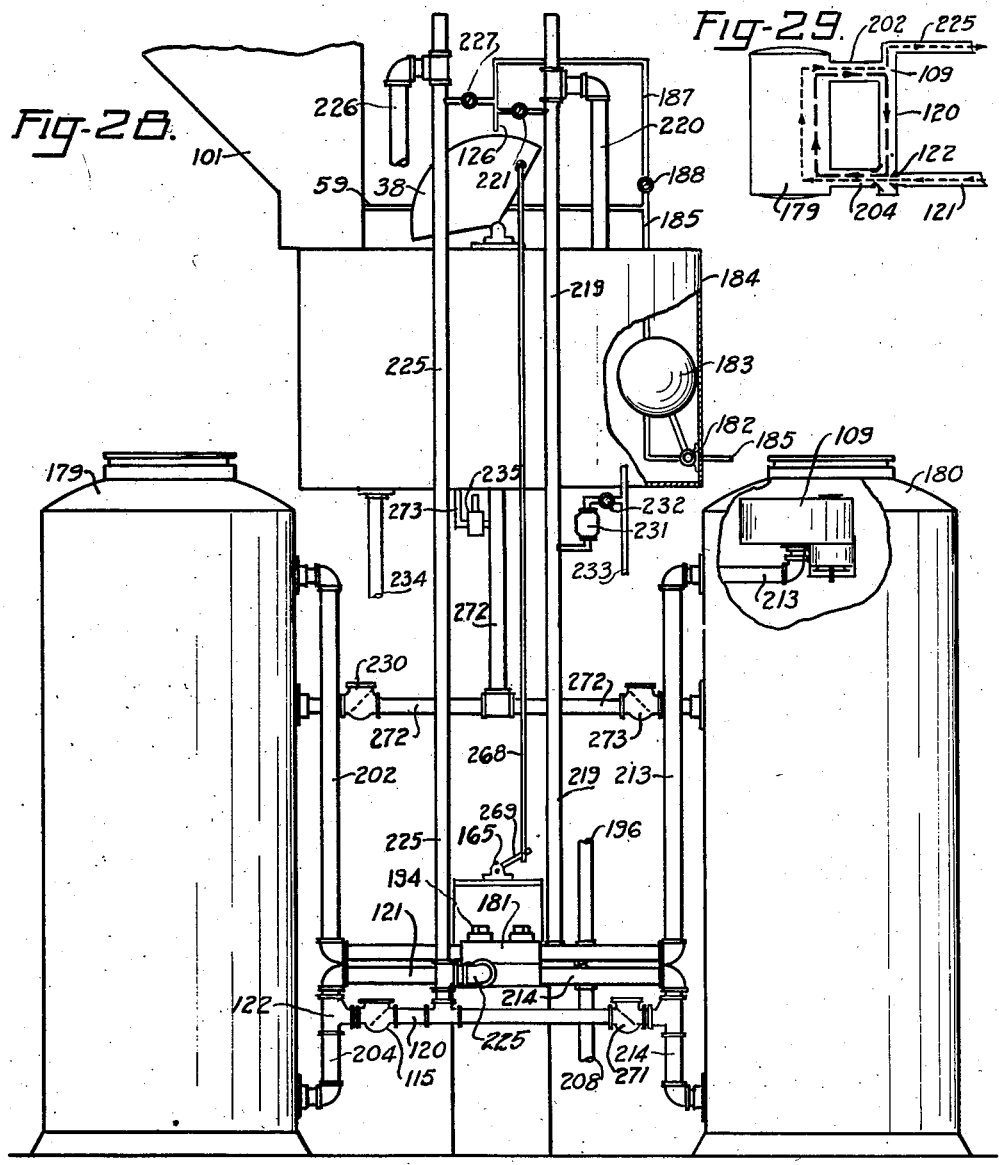
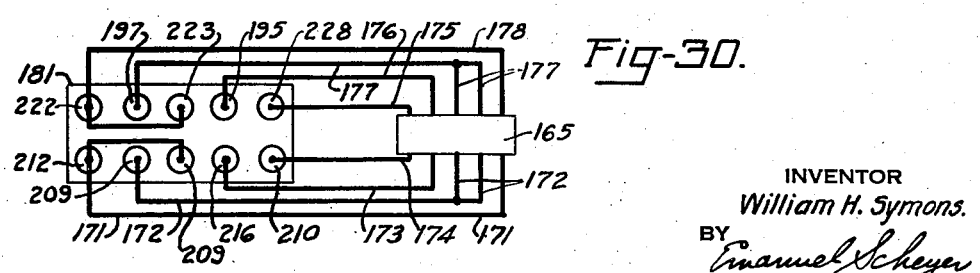
INVENTOR
*William H. Symons.*
BY
*Emanuel Scheyer*
ATTORNEY Oct. 15, 1940.   W. H. SYMONS   2,217,822
WATER TREATING APPARATUS
Filed June 19, 1935   8 Sheets-Sheet 7

INVENTOR
William H. Symons.
BY
Emanuel Scheyer
ATTORNEY

Oct. 15, 1940.  W. H. SYMONS  2,217,822
WATER TREATING APPARATUS
Filed June 19, 1935   8 Sheets-Sheet 8
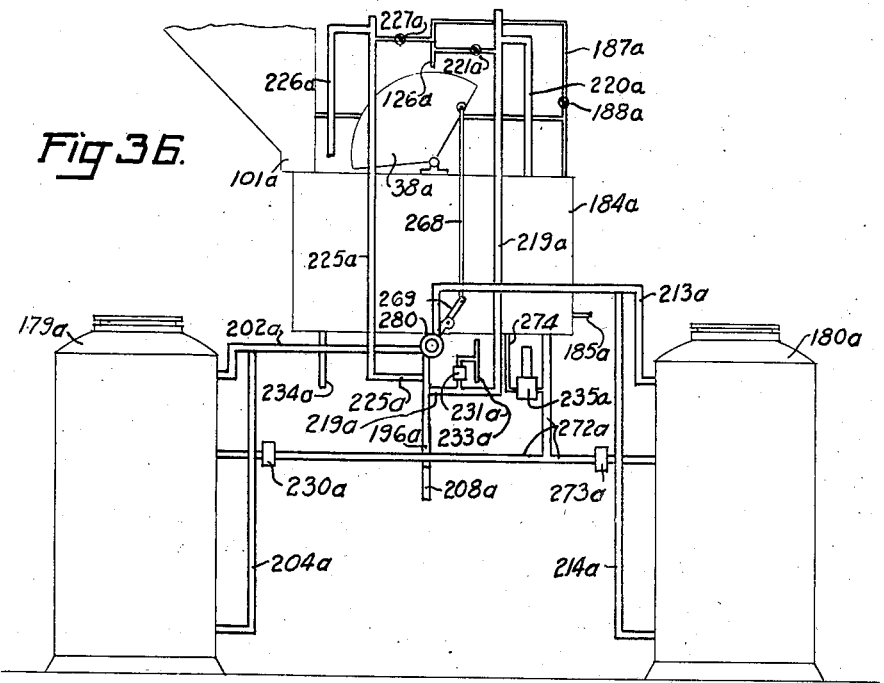
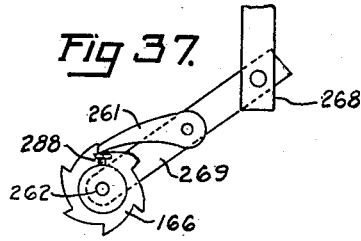
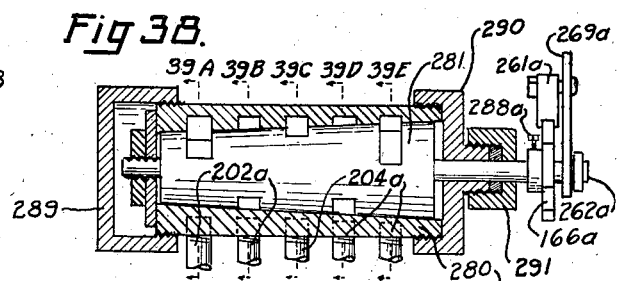
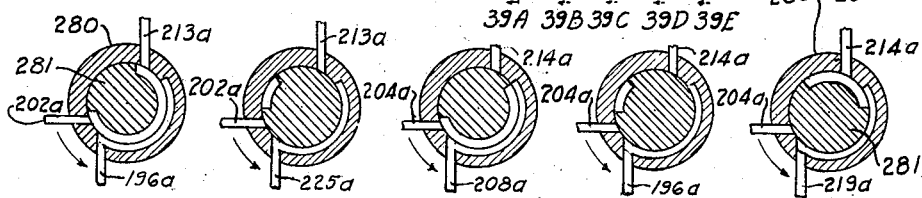
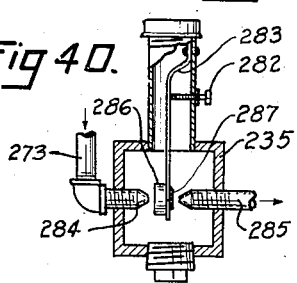
INVENTOR
William H. Symons.
BY
Emanuel Scheyer
ATTORNEY Patented Oct. 15, 1940

2,217,822

UNITED STATES PATENT OFFICE 2,217,822

WATER TREATING APPARATUS

William H. Symons, New York, N. Y.

Application June 19, 1935, Serial No. 27,323

12 Claims. (Cl. 210—24)

This invention relates to an automatic water softener using zeolite. Hitherto it has not been thought feasible to control automatically the various steps of the softening process from the meter without the interposition of electrical means between the meter and the valves controlling the flow through the softener. The small force developed at the meter could not operate the valves previously used, unless it were used to control electric contacts which in turn controlled the flow of electric current through an electric power device as a motor geared to the valves to operate them. In other types of softener the operation was controlled by a clock which controlled the making or breaking of the current through the motor operated valves. Still a third type controlled the current through the electrically operated valves depending on the hardness of the water issuing from the softener. In all these types, a motor, motors or other electrical devices operated from a source of electric power, effect the operation of the valves. If this power fails as by the blowing out of a fuse or something goes wrong with the electric drive, serious trouble may result. As a case in point, where the current, through the motor operating the valves, is controlled by a cam rotated by the meter, if the power supply should fail, the motor will not operate the valve for the particular step called for by the setting of the cam at the time of power failure. Continued rotation of the cam by the meter will set it for controlling the next step or phase. If the power should now come on, the operation of the valves is out of phase with the proper operation of the softener.

My operation of the softener is by hydraulic means, thus eliminating the trouble and expense of motor operated valves or valves operated by other electrical devices. All three types of control mentioned above will effect the proper operation of the softener through my hydraulic means. A detailed description is given below, however, only for the type of control depending on the meter.

The necessary modification required to adapt my hydraulic means to other types of control, such as with a clock or the hardness of the water, will be understood by those skilled in the art. Manual control of the softener can also be effected by my construction.

My construction is such that the valves controlling the flow of water to effect the various phases of the softening operation are in themselves opened and shut by the pressure of the water passing through them, said pressure being balanced and unbalanced in each valve through the opening and closing of a port in the valve, the opening and closing of said port in turn being controlled by the meter or other means. The construction of valve is such that it is self cleaning.

In one type shown herein, the rotation of the meter recording shaft acts to open and close the ports. In another type a small proportion of the water passing through some of the pipes of the softener is bypassed to operate a rotatable device, exemplified in a tip meter described later on, which controls the opening and closing of said ports. The opening and closing of said ports may be effected by clockwork, or by electrical mechanism controlled by the hardness of the water drawn from the softener. Many types of control may be used to open and close the ports, said control bearing a predetermined relation to the operation of the various parts of the softener.

There is a distinct advantage in controlling the operation of the softeners by hydraulic means only. If the water service fails temporarily the whole operation stops, that is the meter and the devices actuated thereby remain in their positions until the water is on again in the system, when the softener will continue on again from the point where it was interrupted.

Where an intermittent type of softener is used, it is an object of my invention to provide an automatically controlled by-pass for the hard water around the softener during the time the softener is being reconditioned, thus providing for fire service or other contingency.

I provide a novel construction and method of operation to reclaim some of the unused brine after regeneration. Novel apparatus is provided to supply a measured quantity of dry salt or other chemical to the reclaimed brine to bring it back to the required density. Novel pressure reducing means are provided to keep down the pressure of the water on the equipment to within a safe limit.

Similar control and construction as for the softeners can be used to backwash and rinse a sand filter when such is operated with the softener or independently thereof. My apparatus has provision for complete manual control when it is desired to supersede the automatic control. Further, manual means are provided to advance the cycle of automatic operation. My tipping meter is of novel construction in that the water is retained in the meter for the greater part of its tipping stroke, thus increasing its power. With my construction the voids of the zeolite are quickly filled with brine at the start of the regeneration. I provide a float chamber in the brine tank whose function it is to retard the stoppage of the rinsing operation until after the zeolite is sufficiently rinsed.

A novel feature of my construction is the provision of apparatus, such as an ejector, for the backwashing which uses the same water more than once for backwashing where there is not a sufficient supply of water available for this operation. I am also enabled to do the backwashing quickly and with greater force, due to the provision of a centrifugal separator or zeolite trap, than has been practical heretofore because of the possible loss of the zeolite. Also a larger proportion of finer grains of zeolite can be used.

Other objects and advantages will become apparent upon further study of the description and drawings, in which—

Fig. 1 is a diagram of the pressure tubes for controlling the valves of the water softening apparatus shown in Fig. 2.

Fig. 2 is a front elevation of a water softening apparatus having two softening tanks and an elevated brine tank, the operation of the valves of this apparatus being hydraulically controlled from the meter, the brine tank being shown in section, a portion of the salt dissolving box being broken away, as well as a portion of one of the softener tanks. The lower portion only of the salt dosing device is shown.

Fig. 3 is a front elevation of a water softener apparatus having one softening tank and a depressed brine pit, the operation of the valves of this apparatus being hydraulically controlled from the meter, the brine pit being shown in section, a portion of the salt dosing device being omitted, and the pressure tubes for the balance valve operation not shown completely.

Fig. 4 is a diagram of the pressure tubes for controlling the valves of the water softening apparatus shown in Fig. 3.

Fig. 5 is a sectional plan of the centrifugal zeolite trap or separator, taken along the line 5—5 of Fig. 6.

Fig. 6 is a vertical section of the separator taken along the line 6—6 of Fig. 5.

Fig. 7 is a vertical section through the float chamber located in the brine tank of Fig. 2 and in the brine pit of Fig. 3.

Fig. 8 is a broken away plan of the trip arm and valve operated by the float rod of the float chamber, the valve shown being used in connection with the softening apparatus of Fig. 2.

Fig. 9 is a fragmental elevation showing a side view of the arm and valve of Fig. 8, and a portion of the float rod.

Fig. 10 is a section through the valve taken along the line 10—10 of Fig. 8.

Fig. 11 is an elevation of the float chamber valve and a fragment of the float chamber wall used for the brine pit of Fig. 3, the trip arm being omitted.

Fig. 12 is a section through the valve taken along the line 12—12 of Fig. 11.

Fig. 13 is a longitudinal section through the valve operated by the tip meter in Fig. 28, said valve controlling the operation of the pressure tubes.

Figs. 14A, 14B, 14C, 14D and 14E are sections, respectively, taken along similarly marked lines of Fig. 13.

Fig. 15 is a partial elevation and a partial vertical section through the valve with part of its operating levers which are controlled by the cams at the meter in Fig. 3, said valve controlling the operation of the pressure tubes.

Fig. 16 is a horizontal section taken along the line 16—16 of Fig. 15.

Fig. 17 is a horizontal section through the cam casing at the meter of Fig. 3, taken along the line 17—17 of Fig. 19.

Fig. 18 is a diagram of the gear train for operating the cams of Fig. 17.

Fig. 19 is a section taken along the line 19—19 of Fig. 17.

Fig. 20 shows the developed periphery of the cams of Fig. 17, with the phases indicated thereon and a conventional representation of the cam operated levers and valve for controlling the pressure tubes of the softening apparatus of Fig. 3, said apparatus having only one softening tank.

Fig. 21 shows the developed periphery of an additional set of cams and the other conventional representations as in Fig. 20, said additional set of cams being required in the cam casing where two softening tanks are operated as in Fig. 2. Figs. 20 and 21 are shown in the proper phase relation with each other for the operation of said two softening tanks.

Fig. 22 is a section through a group of the balance or pressure valves for controlling the operation of the softening apparatus of Fig. 3, the connecting piping being shown in elevation.

Fig. 23 is an end elevation of the valves and piping of Fig. 22.

Fig. 24 is a partial section and elevation of the pressure regulating device for controlling the pressure on the softening apparatus.

Fig. 25 is a partial elevation and vertical section of the lower part of the salt dosing device taken along the line 25—25 of Fig. 26.

Fig. 26 is an end elevation of the lower part of the salt dosing device.

Fig. 27 is a fragmental elevation of the salt dosing device taken along the line 27—27 of Fig. 26.

Fig. 28 is an elevation of a water softening apparatus operated by a tip meter, said apparatus having a boosted backwash system, a portion of the brine tank being broken away to show the float and valve, and a portion of one of the softeners being broken away to show the zeolite trap.

Fig. 29 is a diagrammatic representation of the boosted backwash system for the apparatus of Fig. 28.

Fig. 30 is a diagram of the pressure tubes and valves for the softening apparatus of Fig. 28.

Fig. 36 is a diagrammatic elevation of a softening apparatus having a tip meter operating a valve for directly controlling the flow through the pipes of the apparatus.

Fig. 37 is an elevation of the ratchet device for operating the valve controlling the opening of the pressure tube system for the softener apparatus of Fig. 28 and is also suitable for operating the valve shown in Fig. 38.

Fig. 38 is a horizontal section of the valve for controlling the flow through the pipes of the softening apparatus of Fig. 36. The ratchet mechanism for turning the valve is also shown attached to the valve stem.

Figs 39A, 39B, 39C, 39D and 39E are sections, respectively, taken along similarly marked lines of Fig. 38, and Fig. 40 is a section through the choke or regulating valve from the brine tank for the softening apparatus of Fig. 28 and of Fig. 36.

Figure 31:
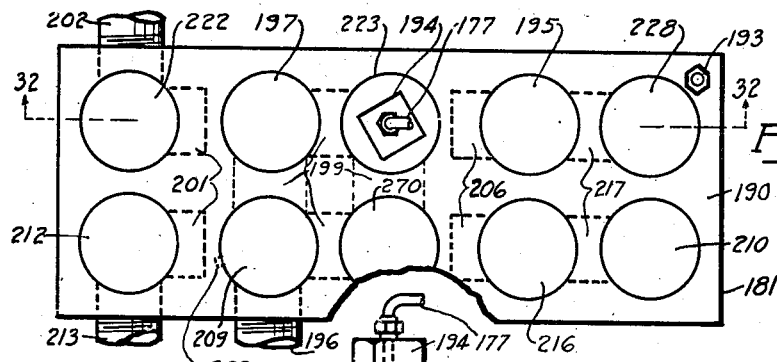
Fig. 31 is a top plan view of the casing for the nest of balance valves for controlling the operation of the softening apparatus of Fig. 28, one screw plug and a portion of a pressure tube connected thereto being shown.

My hydraulic means comprises balance valves, which open and close certain of the pipes leading to and from the softener, such valves being typified by valves 104, 129 and 135 Figs. 3, 4, 22 and 24. Each of said valves has an upper chamber 7 which has an annular shoulder 9 at its lower end encompassing a piston 4. There is a slight clearance between piston 4 and shoulder 9. A groove 203 is provided in piston 4, resulting in a localized enlargement of said clearance opposite said groove. It is to be noted that groove 203 stops short of the bottom of piston 4. The bottom of piston 4 is provided with a gasket 5 (Fig. 24) held in place by ring 236 of spider guide 6. The prongs of guide 6 are free to ride up and down in the opening 12 (Fig. 22) in the bottom of the valve. When the valve is in closed position, ring 236 fills opening 12 and is assisted by gasket 5 in sealing said hole. The chamber 7 of each valve is provided with a port such as that shown at 8 for valve 129. In the case of valve 129, the port 8 is connected by a small diameter pressure tube 128, Fig. 4, as will be explained hereinafter, with valve mechanism at the meter 16, Fig. 3, said valve mechanism opening and closing the end of the pressure tube at the meter in accordance with predetermined amounts of flow of water through the meter. In valve 104, Fig. 24, there is a port 237, whose opening and closing is controlled by a commercial pressure regulator 102 located on the small diameter tube leading from said port for a purpose to be explained later. Port 237 in valve 104 corresponds to port 8 in valve 129.

With the tube from port 8 opened, piston 4 is in the position shown for it in valve 135, that is the valve is open and water may flow out through opening 12. When the tube from port 8 is closed, piston 4 assumes the position shown for it in valve 129, closing off opening 12 so that no water from feed pipe 11 may pass through it. With the tube from port 8 closed, the water in pipe 11 communicates with chamber 7 through the clearance between shoulder 9 and piston 4 and through groove 203. Thus the full pressure of the water in pipe 11 will develop upon the top of piston 4, said piston will move down against its seat about opening 12 and seal said opening with the aid of gasket 5. Now if the tube leading from port 8 is opened, the pressure in chamber 7 will fall practically to zero, as the capacity for the discharge of water through port 8 and the pressure tube leading from it is designed to be much greater than that provided by the clearance between shoulder 9 and piston 4 and through groove 203. As soon as the pressure in chamber 7 falls sufficiently below that in pipe 11, piston 4 will rise opening the valve, due to the fact that the area of piston 4 is greater than that of opening 12. With piston 4 in its uppermost position groove 203 is practically cut off (see valve 135) from the water in pipe 11 because said groove does not reach the bottom of piston 4. In this position, that is with the valve open, there is only the small leakage of water through the annular clearance between shoulder 9 and piston 4. Now if the tube leading from port 8 is closed again, the pressure in chamber 7 will rise owing to the leakage through said annular clearance. As soon as piston 4 drops a little, the leakage is suddenly increased as groove 203 comes into play, causing a rise in pressure in chamber 7 at a quicker rate than before, effecting thereby a faster closing of the valve. There is thus accomplished a fairly rapid closing of the valve, with but only a small leakage of water out through port 8 when the valve is open.

Other types of valves may be constructed by those skilled in the art using my method for balancing and unbalancing the pressure on the moving part of the valve in accordance with the various phases of operation predetermined for the softener. By the remote control of a small proportion of the main flow of water through the apparatus, I control the main flow.

One complete cycle of operations for one softener is composed of four phases:

1. Softening: An amount of water is passed through the zeolite of the softener tank and is softened.

2. Backwashing: The zeolite bed is washed by turning water into the lower strainer system and causing it to flow upwardly through the zeolite bed and out to waste.

3. Regeneration: A quantity of salt brine or other revivifying material is brought into contact with the zeolite.

4. Rinse: The salt brine is washed out of the softener a certain proportion of it being saved or reclaimed.

In installations for handling a large flow of water, a meter 16 of the type shown in Figs. 2 and 3 is used. In this type of meter, indicating pointers, such as shown at 239, Fig. 19, are rotated from a shaft 240 whose rotation is in proportion to the amount of water flowing through the meter.

The installation of Fig. 3 is of the intermittent type for places where a supply of soft water is required only for part of the day. In the particular construction shown, a brine pit 42 is provided set at a lower level than softener tank 3. Hard water from the water supply system enters meter 16 through feed pipe 238. After passing through meter 16, it passes through a system of piping controlled by valves, such as valves 129, 130, 135 and 136, into and out of softener tank 3 and brine pit 42. Mounted above brine pit 42 is a salt measuring device 101 for supplying the proper amount of salt or other regenerating substance for the brine solution, said device being controlled in accordance with the flow of brine out of brine pit 42. The opening and closing of the valves is controlled by a system of small tubes, which I call pressure tubes, comprising such tubes as tubes 128, 134, 141, 150, Fig. 4, leading from a control valve at the meter and from float valves in the brine pit 42.

The valve control at the meter is shown in detail in Figs. 17 to 21 inclusive. Meter 16 differs from the usual meter in that the register and register cover of the latter is removed and replaced by a special casing 14 in which is mounted said valve control. Shaft 17 is provided with a fork at its lower end fitting through holes in original gear 18 of the meter. Gear 18 is fixed to meter shaft 240. Shaft 17 is in axial alignment wi shaft 240 and is in forked engagement with gear 18. Gear 19 is fixed to the upper end of shaft 17. Gear 19 meshes with gear 20 which is fixed to shaft 241, said latter shaft operating the usual gear train 242 for a meter register. Register dial 21 is fastened, by means of posts 294, to the top of casing 14, with indicating pointers 239. Gear 18 meshes with gear 113 fixed to the bottom of a short shaft to the upper end of which is fixed gear 112, which in turn meshes with gear 37 carrying pinion 114. Pinion 114 engages gear 26 which is loose on cam shaft 22. Disk cams 23 and 24 are fixed to cam shaft 22 by screws 25. Upon the top of gear 26 is formed ratchet 28. Pawls 27, which are pivotally mounted on the hub of cam 23, engage ratchet 28 so that the rotation of gear 26 which is counterclockwise, causes cams 23 and 24 to move likewise in this direction as indicated by the arrow in Fig. 17. A ratchet 29 is fixed to cam shaft 22 near its upper end. Handle 30 is loosely mounted on cam shaft 22 just below ratchet 29. A pawl 31 is pivotally mounted on handle 30 and pressed by spring 32 into engagement with ratchet 29. The train of gears beginning with gear 18 and ending with gear 26 is so proportioned that cams 23 and 24 are turned one revolution for one complete cycle of operations of the softener. A valve 15 is mounted upon casing 14, said valve having a rotatable plug 243 mounted therein. Figs. 15, 16 and 20. Plug 243 is provided with a passage 245 opening to atmosphere at the center of its bottom. Arms 33 and 34 are loosely mounted on stem 244 of plug 243. A substantially triangular shaped lug 40 is provided on plug 243, said lug being located between arms 33 and 34. The outer ends of arms 33 and 34 are provided with flanged rollers 35, the roller for arm 33 engaging the periphery of cam 24, while the roller for arm 34 engages the periphery of cam 23. The tension of spring 36 keeps rollers 35 against the peripheries of their respective cams. Said cams are so shaped and set with respect to each other, that when arm 33 is allowed by cam 24 to move inward and press against lug 40, arm 34 is caused to be moved outward away from lug 40 by cam 23 to allow rotation of said lug and the plug 243, by the motion inward of arm 33. The reverse is true when cam 23 allows arm 34 to move inward.

By providing ratchets 28 and 29 the cycle of operations may be advanced manually as desired. Thus if handle 30, which projects through a slot provided in casing 14, is moved counterclockwise, Fig. 17, the cams are advanced in the cycle without interfering with the normal operation of meter 16 and the registering of pointers 239.

The casing of valve 15, Figs. 15, 16 and 20, is provided with three ports connecting with small diameter tubing 128, 141 and 134 respectively. By rotating plug 243 so as to set passage 245 opposite any of these ports, water may be discharged at any time from any one of tubes (pressure tubes) 128, 141 and 134. As noted above, the rotation of plug 243 is controlled by arms 33 and 34 which in turn are controlled by cams 23 and 24. All changes in the position of passage 245 will be made quickly as spring 36 will snap arms 33 and 34 into abrupt notches provided in said cams. The action of said cams in regulating the position of passage 245 will be better understood by referring to Fig. 20, in which is shown the developed periphery of cams 23 and 24. At the beginning of the softening operation arm 33 was well up in notch 246 with arm 34 as shown. This set passage 245 opposite the port for tubing 128.

Succeeding rotation of cams 23 and 24, which is equivalent to moving the developed peripheries shown in Fig. 21 to the left, gradually swings arm 33 away from lug 40, while arm 34 remains in contact with said lug. The softening phase continues until the roller of arm 34 snaps suddenly into notch 247, moving lug 40 and thereby rotating passage 245 opposite the port for tube 134 initiating the backwash phase. Arm 33 in the meantime has been swung away from lug 40. The backwash phase continues, arm 34 being moved away from lug 40 and arm 33 being stationary until it snaps into notch 248 turning lug 40 so as to bring passage 245 opposite the port for tube 141. As will be explained later on, with only tube 141 open, the flow of water through the meter is almost completely stopped and with it the rotation of cams 23 and 24. Regeneration now take place, the brine in pit 42 being sent by injector 72, Fig. 3, through pipe 73 into the top of softener tank 3. When pit 42 has been emptied of its brine, certain float valves operate in said pit, as will be explained, to operate valves for permitting the flow of water again through meter 16. This flow is used to reclaim the brine and rinse the zeolite in tank 3. Water flowing through the meter, sets the cams to rotating again, causing arm 34 to be turned away from lug 40, Fig. 20, while arm 33 is stationary until it reaches and snaps into notch 246 again which moves lug 40 to bring passage 245 opposite the port for tube 128 starting the softening phase again. The operation of the various valves controlled by the pressure tubes to effect the several phases will be explained later.

In Fig. 22, balance or main valve 135 is shown provided with a petcock 163. All the other balance valves, while not shown, may be similarly provided. By opening and closing said petcocks the pressure in chamber 7 of each valve may be controlled. With pressure tubes 128, 134 and 141 closed off at meter 16 by turning plug 243 manually to bring passage 245 out of register with the ports of said pressure tubes, said valves may be manually operated affording a manual control for the operation of the softener.

As noted above, during regeneration there is but little water passing through the meter. The meter cams 23 and 24, therefore, have insufficient rotation to operate the valves. Another form of control is required. This control is effected by the use of float valves operated by the rise and fall of the brine level in the brine tank or pit.

Float chamber 41, Fig. 7 is located in brine pit 42, Fig. 3. With the type of softener shown in Fig. 2, said chamber is located in brine tank 43. Float 44 slides on rod 45 which is held in vertical position by guides 46 and 47. The movement of float 44 along rod 45 is limited by stops 48 and 49 fixedly mounted on said rod. Mounted on the wall of float chamber 41 is a valve 52 having a rotatable plug 249, Figs. 7 to 10. Valve 52 is used on the type of softener shown in Fig. 2. Loosely mounted on stem 250 of plug 249 is trip arm 50, the other end of said arm being looped over rod 45 between stops 49 and 51. When float 44 rises and raises stop 49, arm 50 is raised with it, spring 254 snapping said arm up to uppermost position when the arm has passed dead center. Arm 50 striking against lug 253 on plug 249 turns said plug to the position shown in Fig. 10. When the brine tank is emptied, float 44 presses down on stop 48, causing arm 50 to be moved down by stop 51, until spring 254 snaps it over dead center, causing said arm to strike against lug 251, thereby turning plug 249 away from the position shown.

Float chamber 41 is provided with a check valve 54 for the escape of brine when the brine tank is emptying and a port 55, whose area is adjustable for the entrance of brine when the tank is filling.

When a brine pit 42, Fig. 3, is used, a valve 52 is replaced by a valve 53, Figs. 11 and 12. A different number and arrangement of ports is used for valve 53 than for valve 52 as will become clear hereinafter.

A bin for dry storage of salt with hydraulically operated mechanism for measuring the salt dosage to be applied to the brine tank is shown at 101 mounted above said tank in Figs. 2 and 3. A quantity of salt 198, Fig. 25, is provided in bin 101. The opening at the bottom of portion 255 of bin 101 is controlled by paddles 67 fixedly mounted on shaft 68, Figs. 25, 26 and 27. On the outer end of shaft 68 is mounted ratchet wheel 66. A pivotally mounted pawl 65 has an upper branch and a lower branch, the latter when in its lower position being adapted to engage the teeth 70 of ratchet wheel 66. A cylinder 58 is mounted adjacent to ratchet wheel 66. Leading from the bottom of cylinder 58 is tube 59 which connects with one side of valve 52 of the softener shown in Figs. 1 and 2, and with valve 53 of the softener shown in Figs. 3 and 4. See also Figs. 7 to 12. On the opposite side of valves 52 and 53, tube 59 connects with the main water supply (not shown). When the brine tank is empty the passage through plug 249 of valve 52 is in alignment with the ends of tube 59, allowing water under pressure to enter the bottom of cylinder 58. So also with valve 53, as shown in Fig. 12. Now when the brine tank is filled, plug 249 is turned to cut off tube 59 from the feed side, the right side as shown in Fig. 10. Tube 59, leading from cylinder 58, enters the left side of valve 52 and water may flow from cylinder 58 through the passage in plug 249 and out drain hole 256. The same construction, not shown, is provided for valve 53.

When the brine tank is empty, water under pressure enters cylinder 58 through tube 59, raising plunger 60 and stem 61 against spring 62 pushing plate 63 and plate 64 which is hinged to it up against the under side of the upper branch of pawl 65. This releases the lower branch of pawl 65 from contact with tooth 70, allowing wheel 66 to turn in the direction of the arrow, Fig. 27, said turning being due to the weight of the salt 198 on paddles 67. The salt released from paddles 67 drops into salt dissolving box 69, Figs. 2 and 3. Box 69 is provided with a screened floor 100 and is at least of sufficient size to hold one measured discharge of salt from the salt measuring device 101. The pressure on spring 62 is released, when pawl 65 is disengaged from tooth 70, the upper branch of said pawl slipping off the top of plate 64. When this occurs plates 63 and 64 fly up considerably above the upper branch of pawl 65, allowing said pawl to fall back to have its lower branch engage tooth 70 at the end of one-quarter of a revolution of wheel 66. When the brine tank is filled again, plug 249 of valve 52 is turned to the position shown in Fig. 10, allowing cylinder 58 to be drained through drain hole 256. This allows plunger 60 to fall and with it plates 63 and 64, said latter plate passing the upper branch of pawl 65 as it is hinged to plate 63 by hinge 71.

Construction is provided to reclaim the brine remaining in the softener after regeneration, that is a considerable part of the brine washed out by the rinsing operation.

During regeneration there is an outward flow from nozzle 78 at first of water from the voids of the zeolite, Fig. 3. There is no advantage in reclaiming this, so a baffle plate 77, which is adjustably locatable, is set so that the flow from nozzle 78 at this time, which is not great, does not pass over it, but flows to waste through pipe 79. Then there is a slow flow of diluted brine from pipe 149, Fig. 3, into pit 42. While this flow continues there is again a flow from nozzle 78, this time as rinsing takes place. The new flow from nozzle 78 is considerable, enough to pass over baffle 77, but not over baffle 80.

In the softener of Fig. 2, during regeneration, brine passes into softener tank 1 from brine tank 43 through pipe 81, balance valve 82, check valve 83 and distributor 84, displacing the fresh water in the tank below said distributor, forcing it out through pipe 85, balance valve 86, pipes 87 and 88, inverted vertical check valve 89, choke valve 90 and down pipe 91 to waste. The rate of regeneration is controlled by the setting of choke valve 90. In rinsing, the discharge is much greater causing the flap of inverted check valve 89 to rise against gravity and shut off the flow through waste pipe 91, so that the brine passes up pipe 94 and down pipe 95. When said tank is full, further flow passes up pipe 96 and down pipe 97 to waste without substantially disturbing the reclaimed brine in said tank.

The operation of the softener of Fig. 3 is as follows: With softener tank 3 nearing the end of the softening phase, control valve 15 at meter 16 is set to open pressure tube 128, Fig. 4. With tube 128 open, valves 129 and 130 are open, water passing from supply pipe 238 through meter 16, pipe 11, valve 129, pipe 131 to top of softener tank 3, down through zeolite bed out through pipe 132, valve 130, check valve 140 and pipe 133 to service. This continues until cams 23 and 24 at the meter reach the backwash stage, when valve 15 is turned to open tube 134 and close tube 128. This closes valves 129 and 130 and opens valves 135, 136 and 137. The opening of valve 136 causes water to pass from the meter through pipe 132 into the bottom of softener tank 3, up through the zeolite bed out through pipe 131, valve 135, pipe 138 to waste. The opening of valve 137 allows hard water to by-pass meter 16 and the softener through pipe 139 to service pipe 133, check valve 140 preventing entrance of hard water from pipe 139 into the softener. The by-pass is for the purpose of having water available in case of fire or other emergency. After a predetermined amount of water has passed through the meter, valve 15 will turn from the backwash port to regenerate, thus relieving the pressure in tube 141, causing valves 135 and 136 to close and valves 76 and 142 to open. Valve 137 will remain open as it is connected to tube 141 by tube 143. In this connection it is to be noted that check valve 257 on tube 134 prevents the reduction of pressure in tube 141 from traveling back along tube 134 and thus opening valves 136 and 135. There are a number of other check valves shown similarly to check valve 257 in Fig. 4 on the pressure tubes for a purpose similar to that of said valve. Pipe 75 is connected to the hard water supply, said connection not being shown. The opening of valve 76 allows high pressure water from pipe 75 to pass through injector 72, raising the brine from pit 42 through pipes 259 and 73 check valve 74 to top of softener tank 3, driving fresh water out the bottom through pipe 132, valve 142, choke valve valve 99, pipes 144 and 145, and nozzle 78. Since the amount of the discharge from nozzle 78 is small, it does not pass over baffle 77, but goes out pipe 79 to waste. When brine pit 42 is empty, float chamber 41 is also empty, and float 44, Figs. 7, 11 and 12 causes arm 50 to trip down turning valve 53 so that tube 146 is closed and tube 147 and pipe 59 are open. The opening of pipe 59, as explained hereinbefore, operates the salt measuring device 101, so that a quantity of salt is dropped into salt dissolving box 69. The opening of tube 147 causes valves 129 and 148 to open. The closing of tube 146 by valve 53 when brine pit 42 is empty, closes valves 76 and 142. When brine pit 42 is empty, float 57 closes valve 56 on tube 292. This will prevent the opening of valve 142 through relief of pressure in tubes 150, 292 and 141, it being remembered that during regeneration and rinse, tube 141 is opened at the meter. Water passes through valve 129 and pipe 131 to top of softener forcing the brine now in the top of tank 3 down through the zeolite bed for the slow regeneration of the zeolite, out through pipe 132, valves 148 and choke 98, pipe 149 into pit 42. The flow through pipe 149 is greatly retarded by choke valve 98 in order to give the brine time to react with the zeolite for the proper regeneration of same. When pit 42 is filled to a certain elevation float 57 rises opening valve 56, relieving thereby the pressure in tube 150 which opens valve 142. The remaining brine and rinse water in tank 3 at this time continues to pass out pipe 149 and now in addition through valve 142, pipes 144 and 145, nozzle 78, over baffle 77 to pit. This continues until pit 42 is full, at which time the flow causes backing up over baffle 77 and out through waste pipe 79. When this takes place any further flow from nozzle 78 is prevented by baffle 80 from disturbing the brine in pit 42. At the end of the rinsing phase just noted, the cams at the meter reach the softening phase, turning valve 15 to open tube 128 and close off tube 141, tube 134 remaining closed. This opens valve 130, valve 129 having been already opened by valve 53 through tube 147, and closes valves 137 and 142. Some short time after pit 42 is full, water coming through port 55 will fill float chamber 41, causing float 44 to rise and trip valve 53, opening tube 146 and closing tubes 147 and 59. The opening of tube 146 will not open valve 76 because tube 141 to which it connects is closed at meter 16. With tube 59 closed, the water drains from the cylinder 58, through waste port 256, Fig. 10, setting plate 64, Fig. 27, in position to operate salt measuring device 101 when brine pit 42 empties again. The closing of tube 147 closes valve 148 and hence the flow through pipe 149. All balance valves are now closed except valves 129 and 130, and the softening phase continues until the cams 23 and 24 at meter 16 operate valve 15 for the backwash phase. Port 55 is provided in the upper part of float chamber 41, so that valve 53 closes pressure tube 147 and valve 148, thereby stopping the flow through pipe 149, some time after the brine pit 42 is filled. This is to allow a little extra rinsing to remove every trace of brine from the water in tank 3, before the softening phase starts again. Pressure tubes 128, 134 and 141 are enclosed in pipe 13, Fig. 3.

The softener shown in Fig. 2 differs from that shown in Fig. 3 in that the former is provided with two softening tanks for a continuous supply of soft water, while the latter has only one softening tank giving an intermittent supply of soft water. Under certain conditions, where say a supply of soft water is required only during the daytime, the intermittent type of Fig. 3 is sufficient, but where a continuous supply is necessary the type of Fig. 2 is required, one softener tank supplying soft water, while the other tank is going through the phases of backwashing, regeneration and rinsing.

Where two softener tanks are to be operated, the meter control of Figs. 17 and 19 is modified by adding another set of cams 23 and 24 on shaft 22, lengthening said shaft to accommodate them and enlarging casing 14 correspondingly. Another set of levers 33 and 34 and another valve 15 is used corresponding to the added cams. The additions are not shown in Figs. 17 and 19 as the modifications can be readily understood by those skilled in the art. However, Fig. 21 shows these additions diagrammatically. The added cams 23 and 24 are set on shaft 22 in the phase relation with the original set of cams as shown by the relationship of Fig. 20 to Fig. 21. It is to be noted that the softening phase for one tank somewhat overlaps the softening phase for the other tank, so that one softener tank does not quit softening before the other begins softening, thereby avoiding any interruption in the service.

The operation of the softener shown in Fig. 2 is as follows: Assume that softener tank 2 has just begun its softening phase and that softener tank 1 is nearing the end of its softening phase. The operation will be described for softener tank 1, but it will be understood a similar operation will take place for softener tank 2 but in the phase relation of Figs. 20 to 21. The meter will turn cams for softener 1 then to backwash position shutting off tube 151, Fig. 1, and the equivalent of tube 128, Fig. 20, and at the same time opening tube 152, the equivalent of tube 134, Fig. 20, thereby closing valves 153 and 154, and opening valves 155 and 156, causing water to pass from meter 16 through pipe 259, valve 156, pipe 85 leading to bottom of softener 1, up through zeolite bed 92, out pipe 157, valve 155, pipe 164 to waste. The meter then advances the cams to the regeneration and rinse stage for softener 1, shutting off tube 152, and opening tube 158, the equivalent of tube 141, thereby closing valves 155 and 156 and opening valves 82 and 86. Brine from tank 43 then flows down pipe 81, valve 82, check valve 83, distributor 84, through zeolite bed 92, out pipe 85, valve 86, pipes 87 and 88, inverted vertical check valve 89, choke valve 90 and pipe 91 to waste. The water in the tank above the distributor 84 is not disturbed as the outlet from tank 1 is below, the brine passing directly through the zeolite. The water above the zeolite is afterwards used for rinsing.

It is usually desirable to start regenerating as soon as possible after backwashing. For this reason, the open top of pipe 81 is at a point below the brine surface, when tank 43 is full. The distance below is such that the volume of brine above pipe 81 is just sufficient to fill the voids in zeolite bed 92. Then in the beginning of regeneration, the brine will pass quickly into the softener through top of pipe 81, but when this level is reached, it passes slowly through choke valve 93 until tank 43 is empty.

When brine tank 43 is emptied, float chamber 41 also empties, and float 44, Fig. 7, turns valve 52 to allow the water in tube 59 to operate the salt measuring device 101, dropping salt into box 69. When valve 52 is turned, as just described, it opens up tube 159, thereby causing valve 153 to open, allowing hard water to enter the top of softener tank 1 by way of pipe 157. During regeneration, only a small flow passes through tank 1, out pipe 85, through valve 86, pipe 87, up pipe 88, inverted check valve 89, choke valve 90 to waste pipe 91, a flow which is not sufficient to shut off inverted check valve 89. When however tank 43 has emptied, operating valve 52 to open tube 159 and thereby valve 153, a large volume of water for the rinsing enters tank 1, through pipe 157, leaving through pipe 85, valve 86, pipe 87, up pipe 88 with sufficient pressure to close inverted check valve 89 and therefore is forced to continue its flow up pipe 94 and out pipe 95 into brine tank 43, thus reclaiming the brine. Tank 43 continues to fill until the excess flows into the open top of pipe 97 down to waste. During rinsing the pressure in tank 1 holds check valve 83 closed.

After rinsing, cams 23 and 24 at the meter advance to the softening position, shutting off tube 158 and opening tube 151, causing valves 82 and 86 to close and valve 154 to open, valve 153 remaining open being kept in open position by tube 159 which is kept open by valve 52 for the time being. At the beginning of the softening phase for softener tank 1, softener tank 2 is nearing the end of the softening phase. A short time before softener tank 2 goes into backwash phase, the float chamber 41 fills with brine through port 55, which causes float 44 to operate valve 52 to drain cylinder 58 of the salt measuring device, Figs. 26 and 27, and to close tube 159, so that both valves 153 are now solely under the control of the pressure tubes from the meter.

Figure 34:
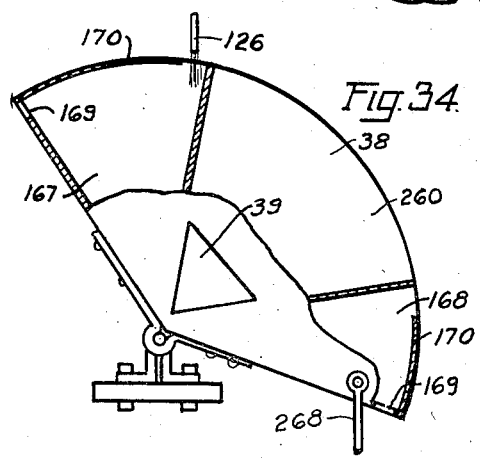
Fig. 34 is a side elevation partially in section of the tip meter of Fig. 28.
Figure 35:
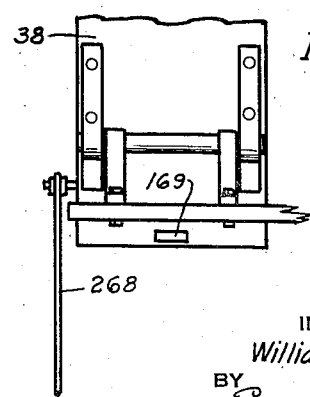
Fig. 35 is a partial end elevation of said tip meter.

The type of softener shown in Fig. 28, is especially suitable for small installations, where the cost of the meter drive comprising a meter 16, with the gears, cams and valves is not justified. Instead of said meter drive, I employ a special tipping meter 38, Figs. 34 and 35. The flow for the tipping of meter 38 comes from nozzle 126 as will be explained hereinafter.

Meter 38 is divided into three compartments, the center or false compartment 260, which plays no direct part in the operation of the meter, being drained through two ports, one of which is shown in the near wall of said meter at 39. The other of said ports, which is not shown, is in the far wall. Compartment 167, when nearly full causes the meter to tip to the left, Fig. 34, engaging and turning ratchet wheel 166, Fig. 37, through pawl 261 link 269 and long rod 268.

Long rod 268, which is pivotally connected at its lower end to link 269, extends down from meter 38. The other end of link 269 is loosely mounted on the stem 262 of plug 263 of valve 165, Figs. 13 and 37. Link 269 carries pawl 261 pivotally mounted upon it, the free end of said pawl engaging the teeth of ratchet wheel 166. Ratchet wheel 166 is fastened by screw 288 to the stem 262 of plug 263 of valve 165. The top of meter 38 has a cover plate 170 extending almost all the way over compartment 167 and another cover plate 170 extending similarly over compartment 168. After the meter has been tipped to the left, as noted above, the flow from nozzle 126 will fill compartment 168. When the latter compartment is nearly full, it causes the meter to tip back to the right, setting pawl 261 in position for engaging the next tooth of ratchet wheel 166. Compartment 167 was drained through port 169 when the meter was tipped to the left. Another port 169 drains compartment 168 when the meter is in the position shown in Fig. 34. The provision of cover plates 170 is an improvement over old forms of tipping meters, in that chambers 167 and 168 carry nearly all the water in them till near the end of their strokes. This results in giving the meter large torque over a long arc.

Valve 165 is a means of controlling the pressure in the system of pressure tubes connecting with the main or balance valves located in casing 181, Fig. 28, the system of tubes being shown diagrammatically in Fig. 30. Valve plug 263 is provided with a series of depressions and passages as seen in Figs. 13, 14A, 14B, 14C, 14D and 14E for providing connections between pressure tubes 171 to 178 inclusive and central escape port 264. Tubes 171, 172, 173 and 174 control the balance valves, as will be explained, for the operation of softener tank 180, Fig. 28, while tubes 175, 176, 177 and 178 control the balance valves for the operation of softener tank 179. With valve plug 263 in the position shown in the drawings, the pressure is relieved in tubes 174, 176, the left hand branch of tube 177 and the right hand branch of tube 172, Figs. 13 and 30. It is to be noted in Fig. 30 that both tubes 172 and 177 have two branches connecting with valve 165. The right hand branches of these tubes are located as shown in Fig. 14D, while the left hand branches are located as shown in Fig. 14C. There are six teeth on ratchet wheel 166, so that one tip to the left and then to the right of meter 38, causes one-sixth of a revolution of valve plug 263 counterclockwise as seen in Figs. 14A to 14E inclusive. This will close the tubes 174, 176, left hand branch of tube 177 and right hand branch of tube 172 and will open tubes 173 and 178.

Float valve 182 in tank 184, Fig. 28, is operated by float 183 which is controlled by the rise and fall of the brine in said tank. It is of a common type and is open when float 183 is down and closed when said float is up. Water under pressure from the mains enters pipe 185 passing through valve 182, and pipe 59, operating the salt dosing mechanism 101, when float 183 is down. At the same time water passes through choke valve 186, pipe 187 and nozzle 126 to meter 38.

Figure 32:
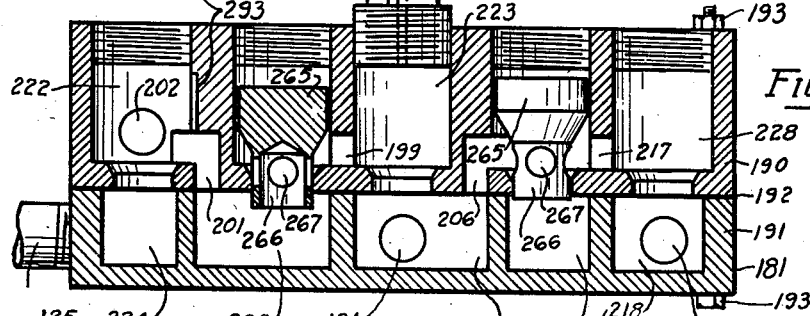
Fig. 32 is a vertical section taken along the line 32—32 of Fig. 31, only two of the valve plungers being shown.
Figure 33:
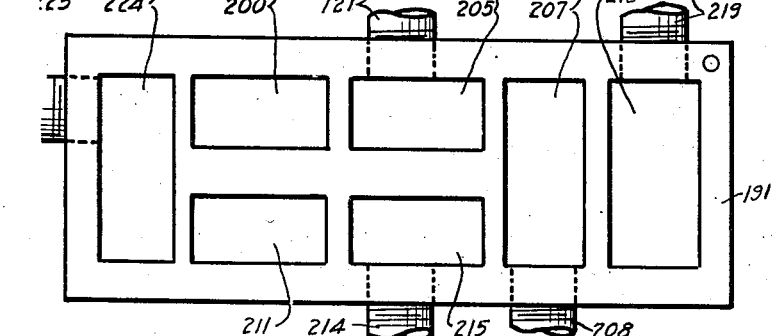
Fig. 33 is a top plan view of the bottom casting of the nest of balance valves for the softening apparatus of Fig. 28.

The balance or main valves controlling the operation of the softener shown in Fig. 28 are located in a single casing 181, Figs. 31, 32 and 33. In this way they differ from balance valves 129, 130, 135 and 136 for the softener shown in Fig. 3, which latter are in separate units connected by piping. They also differ in details of construction, but operate on substantially the same principle. The main valves for the softener, illustrated in Fig. 28, lend themselves readily to be concentrated in a single casing or valve block 181 because the amount of water to be handled is small. On the other hand, a large flow of water is designed to pass through the softeners illustrated in Figs. 2 and 3, say an amount delivered from a 6 inch feed line. The valves in the latter case would be too bulky economically to locate in a single casing. Casing 181 comprises two parts, an upper part 190 and a lower part 191 with a gasket 192 between them and clamped together by bolts one of which is shown at 193. The pressure chambers which are in upper part 190 and the valve seats, are drilled in said part, said chambers corresponding to chambers 7 in Fig. 22. The upper portion of each chamber is tapped and provided with a screw plug, one of which is shown at 194, the screw plugs for the other chambers being omitted for the sake of simplicity in Figs. 31 and 32. Each screw plug is drilled and tapped for a pressure tube, such a tube being shown at 177. These pressure tubes, tubes 171 to 178 inclusive, lead to valve 165 as shown in Figs. 13 and 30, said tubes not being shown in Fig. 28. In Fig. 32 only the plungers or pistons for valves 197 and 195 are shown, the other plungers in the other valves being omitted for simplicity. The plunger for valve 197 is shown in section, and that for valve 195 is shown in elevation. Each plunger comprises a solid upper portion 265, and a hollow lower portion 266 provided with openings 267. When the pressure is relieved in the pressure tube, such as tube 177, the pressure in the pressure chamber above upper portion 265 is reduced to zero or nearly so, as in chamber 7 of valve 129, Fig. 22. The plunger then rises and the water passes through holes 267 in the hollow lower portion 266 of the plunger. When the pressure tube is closed, the pressure builds up in the chamber above portion 265, by the leakage between said portion and the walls of the chamber, causing said plunger to move down against its seat, closing off the flow through the valve. A groove such as that shown at 293 is provided in each of the pressure chambers of the main valves, although only the one for valve 222 is shown in Fig. 32. Groove 293 is provided in order that the pressure will build up rapidly above the plunger, by leakage through said groove, when the pressure tube, such as that shown at 177 is closed. Plunger 265 fits the walls of its pressure chamber quite closely so that there is only a small amount of leakage around it when said plunger is in its uppermost position, with the cylindrical part of said plunger sealing off the top of groove 293. The plungers in valves 197 and 195 are shown already part of the way down in a position to clear the top of their corresponding grooves 293, said grooves not being shown in said valves for clearness. As this small leakage continues, plunger 265 moves down slowly until it clears the top of groove 293, when there occurs a more rapid increase in leakage through said groove, effecting thereby a quicker seating of said plunger on its seat and closing the valve thereby.

Valves 195, 197, 222, 223 and 228 control the operations relating to softener tank 179, while valves 209, 210, 212, 270, and 216 control the operations relating to softener tank 180.

Assuming the softener tank 179 as being near the end of its softening phase and the softener tank 180 in the rinsing stage, the control valve 165 then is in the position shown in Figs. 13, 14A to 14E. Tubes 176 and 177 are open at valve 165, so that valves 195 and 197, which are respectively connected to said tubes, are open. Pipe 196 is the feed pipe supplying the hard water to the system, said pipe being connected to the casing 181 opposite valve 209, Fig. 31. It is to be noted that valves 209, 197, 223, and 270 are connected by openings 199 so that even if the plunger 265 of any of these valves is down on its seat, water will pass from feed pipe 196 into the other valves. This is so because the bottoms of all plungers 265 are beveled, so that there is always a space around each plunger where water can pass into the next valve through an opening if provided, which in the particular case noted above, is opening 199 which leads from this space. As noted, valves 195 and 197 being open, said valves relating to softener 179, feed water flows from pipe 196, through the space around plunger 265 of valve 209, through opening 199 into valve 197, down into duct 200 under said valve, up through opening 201 into the space around plunger 265 of valve 222 which is closed, and out through pipe 202, up through pipe 202 into the top of softener 179 down through the zeolite bed out pipe 204, pipe 121, into duct 205 up through opening 206 into valve 195, which is open, down to duct 207 and out pipe 208 to service. There is no flow from pipe 204 into pipe 120 because of check valve 115.

At the same time the above softening operation is taking place for softener 179, the brine in softener 180 is being reclaimed and the zeolite rinsed. Tubes 174 and 172 are open, Figs. 14A and 14D, so that valves 210 and 209 are open, Fig. 30. Hard water from pipe 196 passes through valve 209 down into duct 211, up through opening 201 into the space around the plunger of valve 212 and out pipe 213 to the top of softener 180, driving the heavy brine and, afterwards, the rinse water out through pipe 214. There is no flow into pipe 120 because of check valve 271.

It is to be noted, Fig. 28, that pipe 213 leads to zeolite trap 109, whose operation will be explained later. A zeolite trap 109, not shown, is also connected to pipe 202. While said trap is only shown for the softener of Fig. 28, it is to be understood it can be used as well with the softeners of Figs. 2 and 3.

Pipe 214 connects with duct 215, the flow from said pipe passing from said duct up through opening 206, around the plunger of valve 216, through opening 217 into valve 210, and as said valve is open, down into duct 218 out pipe 219, pipe 220 into brine tank 184. The rush of water up pipe 219 closes inverted check valve 231, so that no water passes set valve 232 and out pipe 233. Water passes out pipe 233 to waste only during regeneration. A small portion of the flow up through pipe 219, passes through hand set valve 221 and out nozzle 126 into tip meter 38. When brine tank 184 has filled sufficiently, float 183 has been raised to shut off valve 182 on pipe 185 which supplies hard water from the main feed line. When the zeolite in tank 180 is sufficiently rinsed, it is arranged that enough water has passed through nozzle 126 into compartment 167 of meter 38 to tip said meter, turning valve 165 one-sixth of a revolution, that is shutting off tubes 174, 176, and the right hand branch of tube 172, opening tubes 173, 178 and the left hand branch of tube 172 causing tank 179 to enter the backwash phase and tank 180 to begin its softening phase as will now be explained.

Valves 216, 222, 223 and 209 are now open, all the rest are closed in casing 181. Hard water in the softening phase for tank 180 enters pipe 196, passes through valve 209 to duct 211, through opening 201, which connects duct 211 with the space about plunger 265 of valve 212, out pipe 213 to top of tank 180, down through the zeolite therein, out pipe 214 to duct 215, check valve 271 preventing any flow to pipe 120, through opening 206, which connects duct 215 with the space around plunger 265 of valve 216, through valve 216 to duct 207 and out pipe 208 to service.

In the backwashing phase for tank 179, hard water enters pipe 196, through opening 199, through the space around the plunger of valve 270, through opening 199 into valve 223, through valve 223 into duct 205, out pipe 121 and 204 to bottom of tank 179, up through the zeolite therein, out pipe 202 into valve 222 through this valve into duct 224, up pipe 225 (pipe 120 for the present being considered as non-existent) to pipe 226 and down the latter to waste. The flow from duct 224 into pipe 225 could branch off at the bottom of the latter to pass through pipe 120 and check valve 115. For the present neglect pipe 120. A small portion of this water passes through set valve 227 and nozzle 126 to operate meter 38. Control valve 227 is so set that when the backwashing has been completed, enough water has entered meter 38 to cause same to tilt back and forth to turn valve 165 another one-sixth of a revolution. This opens tube 175 and closes tube 178, opening valve 228 and closing valves 222 and 223, thus stopping the backwashing of tank 179 and starting the regeneration phase of the same. Regeneration starts for tank 179 at this time by the emptying of tank 184 through pipe 272. The flow passes from pipe 272 through check valve 230 into tank 179, but it cannot pass check valve 273 into tank 180 at this time, because tank 180 is undergoing the softening phase and the pressure in it keeps check valve 273 closed against any flow from pipe 272. As will be explained, the valves in casing 181 shut off the flow from pipe 202, but permit it from pipe 204. The open position of valves 216 and 209 for tank 180 is not changed at this time, so that the softening phase for the latter continues.

During the regeneration phase for tank 179, valve 228 is the only one open for said tank, brine from tank 184 passing down pipe 272, through check valve 230 into tank 179, through the zeolite, out pipe 204, through pipe 121, duct 205, opening 206 through the space around the plunger of valve 195, opening 217 into valve 228, through the same into duct 218, pipe 219, inverted check valve 231, set valve 232 and pipe 233 to waste. Now as tank 184 empties, float 183 opens valve 182 allowing hard water under pressure from the feed line to pass through pipes 185 and 59 to salt dosing mechanism 101 and also to pass set valve 188 through nozzle 126 to operate meter 38 to turn valve 165 another one-sixth of a revolution for the reclaiming and rinse phase for tank 179, and the softening phase for tank 180. When this phase is reached, the large volume of water passing up pipe 219 causes inverted check valve 231 to snap shut causing the brine and later the rinse water to continue up pipe 219 and down pipe 220 to tank 184, the surplus water (rinse water) going to waste through overflow pipe 234.

The same arrangement of pipes is to be used for tank 184 as for tank 43, Fig. 2. Pipe 234 is the equivalent of pipe 97. Pipe 219 is the equivalent of pipe 94. Pipe 272 is the equivalent of pipe 81. The same arrangement of pipes is to be used in tank 184 as shown for pipes 95, 96, 97 and 81 in tank 43. At the beginning of regeneration the brine flows mainly /through pipe 272, not much through pipe 273 and valve 235. The main flow is into the top of pipe 272, not shown, which is at the same elevation in tank 184 as the top of pipe 81 is in tank 43. After the level of the brine falls below the top of pipe 272, tank 184 continues to empty through pipe 273 and valve 235, the top of pipe 273 being at the bottom of tank 184.

As noted, when tank 184 empties, float 183 opens valve 182, allowing hard water, under practically the full pressure of the feed line from the source of water supply, to pass up pipe 185. Valve 188, however, is set to choke the flow so that but little water and little pressure pass through pipe 187, most of it being forced into pipe 59 to operate the salt dosing mechanism 101, Figs. 25, 26 and 27, raising piston 60. When tank 184 fills, float 183 rises shutting off valve 182 and the pressure from pipe 185. The pressure under piston 60 is then relieved, allowing it to fall, by the escape of water from pipe 59 past valve 188.

Backwashing and then regeneration are the next phases for tank 180 and their action is similar to that described for tank 179. Valve 212 is similar in function to valve 222 for tank 179, except that the former controls the flow to tank 180. In a similar manner valve 270 corresponds in function to valve 223.

The explanation just given for the operation of the softener of Fig. 28 is on the basis that pipe 120 connecting the bottom of pipe 225 with pipe 204 is omitted. Check valve 115 is also to be considered omitted together with part 122, pipe 204 being considered to run straight through. It is possible to backwash tanks 179 and 180, with the omissions just noted, where the water supply is sufficient to furnish enough water at enough pressure for adequate backwashing. Where the water supply is inadequate for this purpose, proper backwashing is made possible by boosting the inadequate supply by the inclusion of pipe 120, check valve 115 and part 122 which is an injector. While the injector is the preferred form, a pump could be used instead. By the said inclusion, a considerable part of the backwash water, instead of going to waste, is used over and over again in the backwashing. This is accomplished as follows, the action being shown diagrammatically in Fig. 29:

Hard water entering through pipe 196, passes through certain of the valves in casing 181, as heretofore explained, and emerges through pipe 121. From pipe 121, the flow is through injector 122, sucking in water through check valve 115, (not seen in Fig. 29 but shown in Fig. 28) from pipe 120 and pipe 225. As will be remembered, the water from the backwashing runs to waste by passing up pipe 225, but the action of injector 122 is to divert some of the waste water back into pipe 120. After passing injector 122, the flow enters pipe 204, passing up through tank 179, out pipe 202, through suitable valves in casing 181 to pipe 225, where part of the flow passes up said latter pipe, while the rest is drawn into backwash circulation through pipe 120 by the action of injector 122.

The three hand controlled valves 227, 221, and 235 control the four phases of both tanks 179 and 180. Valve 227 is set for the desired length of backwash and valve 221 is set for the desired length of rinse. These two valves when once set need never be changed regardless of any change in the time of softening. Any change in the time of softening, however, is accomplished by regulating or choke valve 235. By decreasing the flow through valve 235, and thereby increasing the time it takes tank 184 to empty, the length of the softening phase is increased, because while one tank is in the regenerating phase, the other is in the softening phase, and it is not until brine tank 184 is emptied enough to open valve 182, that water is allowed to pass up pipe 187 and operate tip meter 38 to turn valve 165, to cause the tank in the softening to be placed in the backwash phase.

The zeolite trap 109, Figs. 5, 6 and 28, is used for the purpose of preventing loss of zeolite during backwashing or softening when this is done by the upward flow method well known to the art. With it a large velocity of backwash water may be used, and the zeolite may contain a considerable proportion of fine grains. It will be remembered that the finer the grain, the more active is the zeolite in softening the water. At the top of the trap is a valve plate 123, connected by a rod 105 with a valve plunger 124, which when raised presses against valve seat 106. Pipe 213 connects with the trap through an opening located at the center of the bottom wall of said trap. Above said center opening is set a sleeve 125 almost reaching the top wall. Valve plate 123 when down closes an opening into a curved duct 107, said duct as it curves around with the side wall of the trap expands downwardly until it reaches the bottom wall of the trap. At the same time, said duct becomes narrower until it terminates in a narrow slit 119. Seat 106 is located at the bottom of chamber 111 which communicates with the space under duct 107 and outside of sleeve 125.

During softening water enters sleeve 125 from pipe 213, see also Fig. 28, and overflows the top of said sleeve, down into chamber 111 and out through the clearance 108 between valve plunger 124 and its seat 106. As the area of plunger 124 is greater than that of valve plate 123, both of them are in their lowest position as shown in Fig. 6 since the water pressure is introduced into the inside of the trap through pipe 213. In backwashing, however, there is a much greater rush of water and it comes from the outside of the trap. As the area of plunger 124 is much larger than the area of valve plate 123, the former is raised and held against seat 106 and water enters duct 107 through the opening under valve plate 123. In passing through duct 107 and out slit 119, the water is given a whirl, baffles 118 and 127 keeping the whirl out from sleeve 125. It is found that under these conditions zeolite particles carried by the backwash water separate out at chamber 111, while the water itself passes over the top of sleeve 125 and out pipe 213. When backwashing stops, valve plate 123, rod 105 and plunger 124 drop back to the position shown in Fig. 6, releasing the trapped zeolite.

Instead of using a valve controlled by pressure tubing as an intermediate step, the tip meter 38a, Figs. 36, 38, 39A, 39B, 39C, 39D and 39E can be used to control a valve 280 which is similar to valve 165, Fig. 13, except that valve 280 controls the flow through the pipes of the softener directly instead of using a nest of balance valves 181, and pressure tubes 171, 172, 173 etc. The softening apparatus of Fig. 36 is in general similar in action to that of Fig. 28.

Valve 280 is provided with caps 289 and 290. Valve plug 281 is rotatably mounted in the valve, its stem 262a projecting through a stuffing box nut 291. On the outer end of stem 262a, a ratchet wheel 166a is fixedly mounted by means of set screw 288a. A link 269a carrying a pawl 261a is loosely mounted on stem 262a and rotates valve plug 281, in a manner similar to that shown for the corresponding mechanism in Fig. 28. Link 269a is rocked by long rod 268a in accordance with the tipping of tip meter 38a.

For the softening operation of tank 179a, hard water flows from feed pipe 196a, to valve 280, where as shown in Fig. 39A, it is sent through pipe 202a, tank 179a, pipe 204a, which runs behind pipe 202a as viewed in Fig. 36, back to valve 280 and out through pipe 208a, Fig. 39C, to service.

It is to be noted that pipes 202a, 204a, 196a, 213a and 214a are manifolded at valve 280 to connect to it at several points along its length as seen in Figs. 38, 39A to 39E inclusive.

While tank 179a is being softened, tank 180a is being rinsed, the hard water from feed pipe 196a entering valve 280, Fig. 39A, and leaving through pipe 213a (as well as through pipe 202a) entering tank 180a and leaving it through pipe 214a, back to valve 280 at Fig. 39E, up pipe 219a down pipe 220a to brine tank 184a. It is to be noted that pipe 214a runs behind pipe 213a, as viewed in Fig. 36, on its way to valve 280.

Now tip meter 38a turns valve plug 281, in the direction of the arrows, one-sixth of a revolution, as explained before in connection with Fig. 28, the flow through pipes and valves 187a, 188a, 221a, 126a being similar to those with the same number without the suffix in Fig. 28.

Tank 179a is now in the backwash phase, hard water from pipe 196a entering valve 280, Fig. 39D and leaving same through pipe 204a, entering tank 179a at the bottom, leaving the tank through pipe 202a, returning to valve 280, Fig. 39B, leaving said valve through pipe 225a and then flowing out pipe 226a to waste. At the same time tank 180a is in the softening phase. Hard water from pipe 196a enters valve 280, Fig. 39A, leaving through pipe 213a, entering tank 180a, and leaving said tank through pipe 214a, back to valve 280, Fig. 39C, out pipe 208a to service.

Tip meter 38a now turns valve plug 281 another one-sixth of a revolution, causing tank 179a to enter the regeneration phase, while tank 180a remains in the softening phase. Brine from tank 184a passes out through pipe 274 choke valve 235a, pipe 272a, check valve 230a into tank 179a, out pipe 204a, to valve 280, Fig. 39E, pipe 219a, check valve 231a, and pipe 233a to waste. Pipe 219a leaves valve 280 from behind pipe 196a as viewed in Fig. 36.

As tip meter 38a continues to turn valve plug 281, the tanks 179a and 180a pass through their succeeding phases, with the flow passing through the various pipes as described for the softening apparatus of Fig. 28. The softening apparatus of Fig. 36 differs from that of Fig. 28 in that no boosting of the backwash water is provided as explained in connection with Fig. 29.

Regulating or choke valves 235 and 235a for the apparatus of Figs. 28 and 36, shown in detail in Fig. 40 are provided instead of an ordinary choke valve as shown at 93 in Fig. 2, because it has been found that by restricting the opening in an ordinary valve sufficiently to cause the emptying of the brine tank, such as tank 184 over a considerable time, the opening is so small that there is danger of stoppage due to foreign matter in the brine. I overcome this by providing a construction which effects an intermittent flow of brine through the opening, thus allowing of a much larger opening for the flow of brine than would otherwise be possible.

Brine from tank 184 of Fig. 28 passes out through pipe 273 and is discharged from nozzle 284, impinging upon cup 286, forcing the latter to the right against the tension of spring 283. This causes gasket 287 to cover the opening in pipe 285 thus momentarily stopping the flow of brine. Spring 283 is adjusted by screw 282 so that when the flow is thus arrested by gasket 287, the tension in said spring is sufficient to move said gasket away from the opening in pipe 285, thus allowing a momentary flow again. This action is repeated over and over again, thus allowing a succession of small quantities of brine to pass out through pipe 285.

In Fig. 24 is shown a pressure regulating valve 104 for controlling the pressure of the feed water on the softener tank and equipment to protect them against excessive pressures. Said valve can be located on the feed water line, say pipe 196 of Fig. 28 (not shown in Fig. 28). A small commercial pressure regulator 102 with bypass piping and petcocks 103 connects the pressure chamber 7 with feed pipe 196. Valve 104 is similar to those shown in Fig. 22. Regulator 102 is set to the allowable pressure. Any increase above this pressure will cause regulator 102 to shut off the bypass between chamber 7 and pipe 196. This causes the pressure in chamber 7 to increase, throttling the flow through opening 236. Then as the pressure in pipe 196 decreases, pressure regulator 102 opens the bypass, reducing the pressure in chamber 7 allowing plunger 4 to rise. In this way the small pressure regulator 102 keeps the large valve 104 in balance.

The term "tube" as used in the claims is intended to be broad enough to include a duct or member having an opening or passage for flow therethrough.

I claim:

1. In a water softening apparatus, a pair of containers, each for holding softening material, means for separately subjecting the material in one container from that in the other to different phases of flow including a softening phase, a backwash phase, and a regeneration-rinse phase, said means including a piping system for controlling the flow through the containers, a plurality of valves in accordance with their opening and shutting controlling the flow through said system, a plurality of pressure tubes leading from said valves, the opening and shutting of the valves being controlled by the pressure in said tubes, means for opening and closing said tubes controlling thereby the pressure in them, mechanism operated by the incoming hard water, and means engaged by said mechanism for operating the means to open and close the tubes in a predetermined order effecting, the softening phase for one container substantially during the backwash phase and regenerate-rinse phase for the other.

2. In a water softening apparatus, a pair of containers for water softening material subject to phases of softening, regeneration and flushing, means for separately subjecting the material in one container from that in the other to said phases including a piping system for controlling the flow through said apparatus, a plurality of valves in accordance with their opening and shutting controlling the flow connections through said system for the actuation of said means for effecting said phases, a pressure tube leading from each valve effecting the opening and closing of its valve in accordance respectively with whether the tube is open or closed, and mechanism for opening and closing said tubes in a predetermined order pursuant to the flow through the apparatus for the actuation of said means for effecting said phases in each container in a predetermined order, the softening phase occurring in one container substantially during the regeneration and flushing phases in the other.

3. In a water softener, a container for regenerating solution, a float chamber in said container, float means in said chamber, valve means controlling flow through the softener in accordance with the position of the float means, means near the bottom of said chamber to allow water to flow out of the chamber into the container but not to return, said chamber being open for the entrance of solution from the container near its upper end, whereby the float in the chamber is not raised until after the container is filled sufficiently to have its solution overflow from the container into the chamber.

4. In a water softener, a container for regenerating solution, a hopper for holding regenerating material, means for discharging a measured quantity of said material into said container from the hopper for producing the regenerating solution, and float mechanism in said container for actuating said means to discharge said material into the container in accordance with a predetermined level of fluid in said container.

5. A water softener having a container for holding water softening material, another container for holding regenerating solution, the container for the solution extending higher than the top of the water softening material, pipe means connecting said containers for gravity flow of the regenerating solution to the softening material, said pipe means having two branches, one retardent to flow and the other offering freedom to flow, the branch offering freedom to flow having an inlet in the container for the regenerating solution located a distance below where the top of the regenerating solution comes just before the regenerating phase, said distance being such that the volume of the solution in said latter container above the inlet is substantially equal to the volume of the spaces between the particles of the softening material, the branch retardent to flow leading from the latter container substantially at the bottom of the solution, and means permitting the flow of the solution through the pipe means at a predetermined time in the operation of the softener.

6. In a water softening apparatus, a piping system for the flow through the apparatus, a member in said system having a plurality of chambers with inlet and outlet openings and passages between the chambers, a piston for each chamber adapted to reciprocate therein, each chamber with its piston constituting a valve, the opening and closing of said valves distributing the flow through said system for setting the softening apparatus in the several phases of its operation, a plurality of pressure tubes, a tube leading from each of said chambers, each piston operating to allow the passage of liquid through its chamber when the pressure in the pressure tube from its chamber is relieved, and means for effecting the relief of pressure in said tubes in a predetermined sequence actuated by the flow through the apparatus.

7. In a water softener, a container for holding water softening material, a water supply line connected to said container for sending water up through the water softening means for backwashing, a discharge line connected to said container for discharging to waste the backwash water after it has passed through the water softening material, a bypass connected at one end to the discharge line before its point of discharge, the other end of the bypass discharging into the water in the container below the water softening material, and pressure boosting means connected to the bypass for sucking back some of the waste water from the discharge line through the bypass and forcing it into the container to serve again as backwash water.

8. In a water softener, a container for holding water softening material, a water supply line connected to said container for sending water up through the water softening means for backwashing, a discharge line connected to said container for discharging to waste the backwash water after it has passed through the water softening material, a bypass connected at one end to the discharge line before its point of discharge and at its other end to the water supply line, an injector on the water supply line connected to the bypass whereby the water from the water supply line sucks back some of the waste water from the discharge line through the bypass into the water supply line and forces it into the container to serve again as backwash water.

9. In a water softener, a container for holding liquid, a receptacle for holding regenerating material out of contact with said liquid, said receptacle being in communication with said container for discharging said material into the liquid, and means controlled by the flow through the softener for discharging a measured quantity of said material into said liquid at a predetermined time in the operation of the softener.

10. In a water treating apparatus, means for holding water treating material, means for subjecting said material to phases of softening, backwash, regeneration and rinsing, including a piping system for conveying the flow through said apparatus, a plurality of valves for controlling the flow through said system for effecting said phases, a plurality of pressure tubes connected to said valves, said valves operating to allow or stop the flow through themselves in accordance with the pressure in said tubes, valve means connected to said tubes for selectively allowing the escape of water from said tubes to control the pressure therein, said valve means having a part moved by the flow of water through the apparatus for controlling the escape of water from said tubes in a predetermined sequence.

11. A plurality of valves for the circulation system of water treating apparatus in accordance with their opening and closing controlling the flow through said system for effecting the phases of treatment, each of said valves having a chamber with an inflow opening and an outflow opening, said latter opening being at an end of the chamber and the inflow opening being at the side of the chamber and substantially adjacent said end, a piston slidably mounted in said chamber, loosely fitting therein allowing thereby water from the inflow opening to leak past the piston into one end of the chamber away from the outflow opening thereby building up pressure on the side of the piston away from the outflow opening and forcing the piston to move away from said latter end toward the outflow opening and seal it off, a pressure tube leading from said latter end of the chamber, water leaking out through the pressure tube when opened relieving thereby the pressure built up by leakage in said end permitting the piston to move away from the outflow opening under the influence of the water pressure from the inflow opening and opening the valve thereby, and means for opening and closing the pressure tubes, said piston having at least one axial groove on its side extending from the end of the piston nearer the pressure tube, to a point just short of the opposite end of the plunger whereby there is slow leakage past the piston when located in its extreme position away from the outflow opening and fast leakage through the groove when the piston is located elsewhere.

12. A plurality of valves for the circulation system of water treating apparatus in accordance with their opening and closing controlling the flow through said system for effecting the phases of treatment, each of said valves having a chamber with an inflow opening and an outflow opening, said latter opening being at an end of the chamber and the inflow opening being at the side of the chamber and substantially adjacent said end, a piston slidably mounted in said chamber, loosely fitting therein allowing thereby water from the inflow opening to leak past the piston into the end of the chamber away from the outflow opening thereby building up pressure on the side of the piston away from the outflow opening and forcing the piston to move away from said end toward the outflow opening and seal it off, a pressure tube leading from said latter end of the chamber, water leaking out through the pressure built up by leakage tube when opened relieving thereby the pressure in said latter end permitting the piston to move away from the outflow opening under the influence of the water pressure from the inflow opening and opening the valve thereby, and means for opening and closing the pressure tubes, said chamber having at least one axial groove in its wall extending from a point just short of the end of the piston nearer the tube, when the piston is at the limit of its travel toward the pressure tube, toward the end of the chamber having the outflow opening whereby there is slow leakage past the piston when located at said limit of its travel and fast leakage through the groove when located elsewhere.

WILLIAM H. SYMONS.